United States Patent
Evans et al.

(10) Patent No.: US 10,057,488 B2
(45) Date of Patent: Aug. 21, 2018

(54) IMAGE CAPTURE WITH DIGITAL LIGHT PATH LENGTH MODULATION

(71) Applicant: Avegant Corp., Belmont, CA (US)

(72) Inventors: Allan Thomas Evans, San Francisco, CA (US); D. Scott Dewald, Dallas, TX (US); Andrew John Gross, Redwood City, CA (US)

(73) Assignee: Avegant Corp., Belmont, CA (US)

( * ) Notice: Subject to any disclaimer, the term of this patent is extended or adjusted under 35 U.S.C. 154(b) by 93 days.

(21) Appl. No.: 15/398,705

(22) Filed: Jan. 4, 2017

(65) Prior Publication Data

US 2018/0048814 A1 Feb. 15, 2018

Related U.S. Application Data

(63) Continuation-in-part of application No. 15/358,040, filed on Nov. 21, 2016, which is a (Continued)

(51) Int. Cl.
*H04N 5/00* (2011.01)
*G02B 27/40* (2006.01)
(Continued)

(52) U.S. Cl.
CPC ......... *H04N 5/23238* (2013.01); *G02B 27/28* (2013.01); *G02B 27/40* (2013.01); *G06T 5/003* (2013.01); *G06T 5/50* (2013.01); *H04N 5/2253* (2013.01); *H04N 5/2254* (2013.01); *H04N 5/23229* (2013.01); *H04N 5/23293* (2013.01);
(Continued)

(58) Field of Classification Search
None
See application file for complete search history.

(56) References Cited

U.S. PATENT DOCUMENTS 3,586,416 A 6/1971 Bitetto
3,856,407 A * 12/1974 Takeda ................. G01C 3/32
250/201.7
(Continued)

FOREIGN PATENT DOCUMENTS

WO 2012104839 A1 8/2012
WO 2012175939 A1 12/2012
(Continued)

OTHER PUBLICATIONS

Matjasec et al., "All-optical thermos-optical path legth modulation based on vanadium-doped fibers", Optical Society of America, vol. 21, No. 10, May 2013, pp. 1-14 (Year: 2013).*
(Continued)

*Primary Examiner* — Reza Aghevli
(74) *Attorney, Agent, or Firm* — HIPLegal LLP; Judith Szepesi

(57) ABSTRACT

An image capture system comprising an optical path length extender (OPLE) to direct the light having a first polarization through a first light path through the OPLE, and to direct the light having a second polarization through a second light path through the OPLE, the first and second light paths having different light path lengths. The image capture system further comprising an image sensor to capture a plurality of image portions at a plurality of focal distances.

20 Claims, 15 Drawing Sheets

Camera 100

Related U.S. Application Data continuation-in-part of application No. 15/236,101, filed on Aug. 12, 2016.

(51) Int. Cl.

| | | |
|---|---|---|
| *G02B 27/28* | (2006.01) | |
| *G06T 5/00* | (2006.01) | |
| *G06T 5/50* | (2006.01) | |
| *H04N 5/232* | (2006.01) | |
| *H04N 5/225* | (2006.01) | |
| *H04N 5/262* | (2006.01) | |

(52) U.S. Cl.
CPC . *H04N 5/2621* (2013.01); *G06T 2207/10148* (2013.01); *G06T 2207/20221* (2013.01)

(56) References Cited

U.S. PATENT DOCUMENTS

| | | | |
|---|---|---|---|
| 4,670,744 A | 6/1987 | Buzak | |
| 5,610,765 A | 3/1997 | Colucci | |
| 5,751,243 A * | 5/1998 | Turpin | G01S 7/20 250/370.08 |
| 6,580,078 B1 | 6/2003 | O'callaghan et al. | |
| 7,360,899 B2 | 4/2008 | Mcguire, Jr. et al. | |
| 7,905,600 B2 | 3/2011 | Facius et al. | |
| 8,262,234 B2 | 9/2012 | Watanabe | |
| 8,755,113 B2 | 6/2014 | Gardner et al. | |
| 9,025,067 B2 * | 5/2015 | Gray | G02F 1/09 348/335 |
| 9,304,319 B2 | 4/2016 | Bar-Zeev et al. | |
| 9,494,805 B2 | 11/2016 | Ward et al. | |
| 9,588,270 B2 | 3/2017 | Merrill et al. | |
| 2002/0191300 A1 * | 12/2002 | Neil | G02B 23/14 359/645 |
| 2003/0020925 A1 | 1/2003 | Patel | |
| 2004/0156134 A1 | 8/2004 | Furuki et al. | |
| 2004/0263806 A1 | 12/2004 | Silverstein et al. | |
| 2005/0141076 A1 * | 6/2005 | Bausenwein | G02B 26/0833 359/291 |
| 2006/0119951 A1 | 6/2006 | McGuire | |
| 2007/0030456 A1 | 2/2007 | Duncan et al. | |
| 2007/0030543 A1 | 2/2007 | Javidi et al. | |
| 2007/0139760 A1 | 6/2007 | Baker et al. | |
| 2007/0146638 A1 | 6/2007 | Ma et al. | |
| 2008/0130887 A1 | 6/2008 | Harvey et al. | |
| 2008/0174741 A1 * | 7/2008 | Yanagisawa | G03B 21/16 353/31 |
| 2009/0061505 A1 * | 3/2009 | Hong | G01N 21/6452 435/287.2 |
| 2009/0061526 A1 * | 3/2009 | Hong | C12Q 1/6869 436/94 |
| 2009/0237785 A1 | 9/2009 | Bloom | |
| 2009/0244355 A1 * | 10/2009 | Horie | G02B 5/22 348/340 |
| 2011/0032436 A1 | 2/2011 | Shimizu et al. | |
| 2011/0149245 A1 * | 6/2011 | Barth | A61B 3/1005 351/215 |
| 2012/0075588 A1 | 3/2012 | Suga | |
| 2013/0100376 A1 | 4/2013 | Sawado | |
| 2013/0222770 A1 | 8/2013 | Tomiyama | |
| 2014/0168035 A1 | 6/2014 | Luebke et al. | |
| 2015/0061976 A1 | 3/2015 | Ferri | |
| 2015/0205126 A1 | 7/2015 | Schowengerdt | |
| 2015/0319342 A1 | 11/2015 | Schowengerdt | |
| 2016/0041390 A1 | 2/2016 | Poon et al. | |
| 2016/0041401 A1 | 2/2016 | Suga | |
| 2016/0077338 A1 | 3/2016 | Robbins et al. | |
| 2016/0131920 A1 | 5/2016 | Cook | |
| 2016/0195718 A1 | 7/2016 | Evans | |
| 2016/0225337 A1 | 8/2016 | Ek et al. | |
| 2016/0227195 A1 | 8/2016 | Venkataraman et al. | |
| 2017/0038579 A1 * | 2/2017 | Yeoh | G02B 6/0023 |
| 2017/0068103 A1 | 3/2017 | Huang et al. | |
| 2017/0075126 A1 | 3/2017 | Carls et al. | |
| 2017/0097507 A1 * | 4/2017 | Yeoh | G02B 6/0026 |
| 2017/0146803 A1 | 5/2017 | Kishigami et al. | |
| 2017/0160518 A1 | 6/2017 | Lanman et al. | |

FOREIGN PATENT DOCUMENTS

| | | |
|---|---|---|
| WO | 2015190157 A1 | 12/2015 |
| WO | 2016087393 A1 | 6/2016 |

OTHER PUBLICATIONS

Sandner et al., "Translatory MEMS actuators for optical path length modulation in miniaturized Fourier-transform infrared spectrometers", MEMS MOEMS 7(2), Apr.-Jun. 2008, pp. 1-11 (Year: 2008).*

Hu, Xinda et al., "High-resolution optical see-through multi-focal-plane head-mounted display using freeform optics," Opt. Express 22, 13896-13903 (2014).

Lee, Yun-Han et al., Switchable Lens for 3D Display, Augmented Reality and Virtual Reality. Society for Information Display (SID), International Symposium Digest of Technical Papers, vol. 47, Issue 1, May 25, 2016 (4 page).

Pate, Michael, Polarization Conversion Systems for Digital Projectors, Web Publication, Apr. 21, 2006, Downloaded from http://www.zemax.com/os/resources/learn/knowledgebase/polarization-conversion-systems-for-digital-projectors on Jun. 17, 2016 (8 pages).

Polatechno Co., Ltd., LCD Projector Components, http://www.polatechno.co.jp/english/products/projector.html downloaded Jun. 17, 2016 (2 pages).

PCT Search Report & Written Opinion PCT/US2017/046645, dated Oct. 30, 20017, 12 pages.

\* cited by examiner

IMAGE CAPTURE WITH DIGITAL LIGHT PATH LENGTH MODULATION

RELATED APPLICATIONS

The present invention claims priority to U.S. patent application Ser. No. 15/236,101, filed on Aug. 12, 2016. The present invention also claims priority to U.S. patent application Ser. No. 15/358,040 filed on Nov. 21, 2016. The above applications are incorporated herein by reference.

FIELD

The present invention relates to an image capture system, and more particularly to an image capture system utilizing light path length modulation.

BACKGROUND

Providing multiple focal planes, or discrete steps of focus adjustment, is useful for a number of applications. It can be part of capturing three dimensional data. In the prior art, multiple focus capture utilized mechanical movement such as gears or liquid lenses. Such mechanisms are expensive, slow, and relatively fragile. Another prior art method of capturing multiple focal lengths involves using multiple cameras. However, this is bulky and expensive. The bulk and expense also limits the number of focal lengths that can be simultaneously captured.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

An image capture system is described. The image capture system in one embodiment includes a modulation stack, with one or more digital light path length modulators. Each digital light path length modulator includes an optical path length extender (OPLE) and a polarization modulator, and can be used to adjust the path length of light. In one embodiment, light with state 1 polarization travels through a longer path in the OPLE than light with state 2 polarization. This can be used to capture data at two or more focal distances. An OPLE is made up of one or more plates with a plurality of polarization sensitive reflective elements. A plurality of digital light path length modulators create the modulation stack. In one embodiment, the image capture system may include a striped OPLE to capture images at two focal distances.

This mechanism can be used for cameras and image capture, and various other uses in which light waves or other waves in a similar spectrum are captured. Cameras may include conventional cameras with both fixed and interchangeable lenses, including but not limited to cell phone cameras and DSLR cameras, medical cameras such as endoscopes, and other types of probes or cameras which acquire image data.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
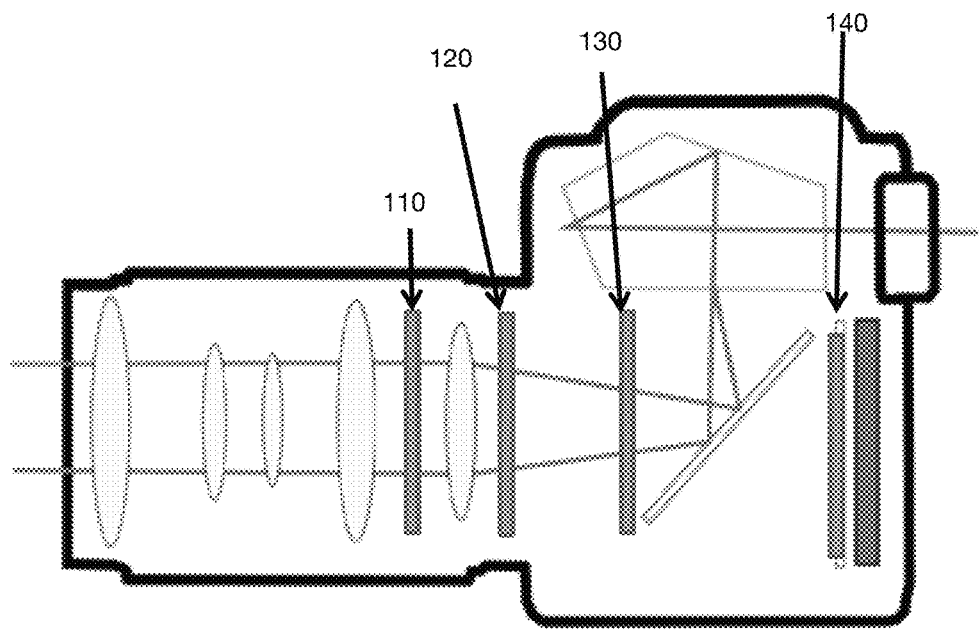
FIG. 1 is an overview diagram of a camera system in which the present invention may be used.

FIG. 1 is an overview diagram of a camera system in which the present invention may be used. The exemplary camera 100 is a standard digital camera, in one embodiment. In one embodiment, the image capture system in a camera includes a detachable lens. The focus distance adjustment may be embodied in various parts of the camera. In FIG. 1, it is shown in four different positions 110, 120, 130, and 140. The focus distance adjustment may be integral to the lens, as shown with element 110. The focus distance adjustment may be external to lens element but part of the lens, as shown in element 120. The focus distance adjustment may be integral to the camera, as shown in element 130. The focus distance adjustment may also be in front of the sensor, a shown in element 140. In one embodiment, the focus distance adjustment positioned in front of the sensor may be a striped OPLE, as will be described in more detail below. In one embodiment, there may be multiple focus distance adjustments, in a single camera/image capture system.

In one embodiment, by positioning the focus distance adjustments within the camera lens assembly, the system can be used to retrofit an existing camera system for capturing multiple focal points utilizing a single CCD (charged coupled device) or other image capture mechanism. The camera system 100 is merely an example of an image capture system.

Figure 2:
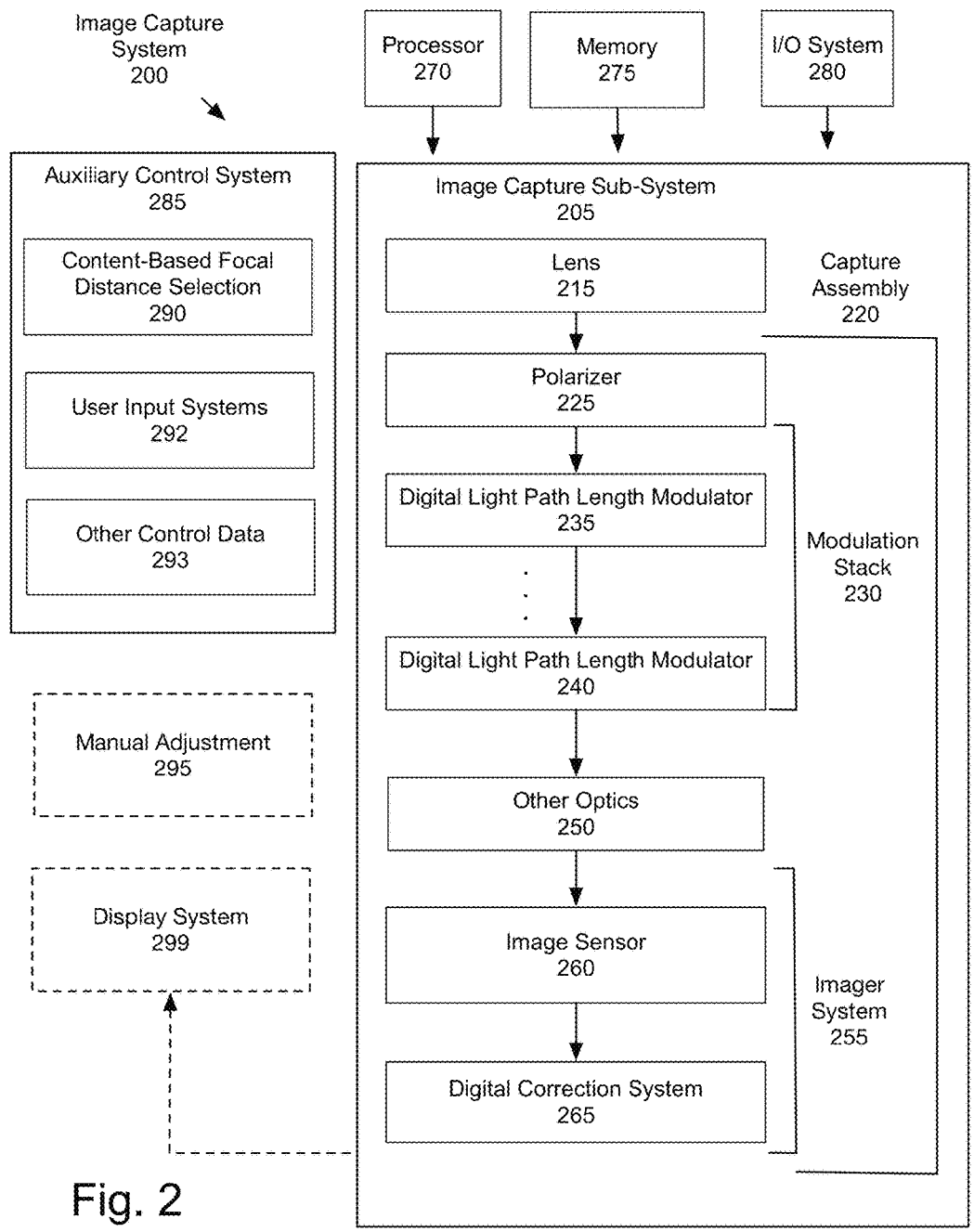
FIG. 2 is a block diagram of one embodiment of an image capture system.

FIG. 2 is a block diagram of one embodiment of an image capture system. The image capture system 200 includes, in one embodiment, a processor 270, memory 275, and I/O system 280, as well as an image capture subsystem 205, and optionally an auxiliary control system 285. In one embodiment, the system also includes a display system 299, which enables the system 200 to display the captured data.

Processor 270 in one embodiment may be used to control the image capture sub-system 205, to adjust the light path lengths. The processor 270 may also be used to post-process the captured data, in one embodiment. Memory 275 may be a buffer-memory, enabling the image capture system 200 to capture image and video data. I/O system 280 makes the captured image data available to other systems. In one embodiment, post-processing takes place in a separate device, such as a computer or server system, which provides post-processing for the captured image data.

The image capture subsystem 205 includes, in one embodiment, capture assembly 220, modulation stack 230, and imager system 255. The lens 215 in one embodiment is a conventional lens to capture an image.

The polarizer 225 allows light with a particular polarization to pass through. In one embodiment, the polarization may be S/P polarization, or circular polarization. The polarizer 225 in one embodiment is a linear polarizer. The polarizer 225 in one embodiment is a linear polarizer with a backwards circular ¼ wave polarizer. Such a combined polarizer addresses glare issues.

The capture assembly 220 includes a modulation stack 230. The modulation stack 230 includes one or more digital light path length modulators 235, 240. The digital light path length modulators 235, 240 alter the light path length based on the polarization of the light. In one embodiment, polarizer 225 may be positioned after modulation stack 230.

Capture assembly 220 is used to capture images at multiple focal distances. In one embodiment, the image capture subsystem 205 may include additional mechanical and optical elements 250 which can provide correction or alteration of the image.

The image data is captured by imager system 255. Imager system 255 includes an image sensor 260. In one embodiment, it further includes a digital correction system 265. In another embodiment, the digital correction may take place in a different system from the image capture system 200. This may include, in one embodiment, reconstructing the image (s), based on the captured data, and data from the modulation stack.

In one embodiment, the system may receive data from auxiliary data system 285, which may be used to control the image capture sub-system 205, directly or through processor 270. The auxiliary data system 285 may provide information for selecting the appropriate focal lengths. As noted above, the modulation stack 230 allows image elements to be captured at various focal distances. The auxiliary control system 285 may be used to select the focal distances, based on various factors.

One auxiliary control system may be a content-based focal distance selection 290, which enables the system to selectively choose one or more focal distances, based on what is being captured. For example, the system may selectively choose a portion of the image data for focus. In one embodiment, content-based focal distance selection 290 may utilize a distance sensor, to detect a distance, for capture. One example of a distance sensor that may be used is a time of flight sensor. Based on the type of system, the focal distances selection may vary. For example, to capture a fingerprint including blood flow data, the system may sense a distance to the finger, and then identify a second focal distance beyond that distance. In one embodiment, the user input system 292 may enable a user to select the use of the image capture system 200. In one embodiment, such selection may be made via a remote system, such as a mobile device paired with the image capture system 200.

User input systems 292 enable focus selection based on user input, through various mechanisms. Such user input may be provided via gesture, voice control, an adjustment dial or another selection mechanism. As noted above, the user input system 292 may be coupled with the content-based focal distance selection 290, such that the user enters the targeted image capture and purpose, and the actual focal distances are selected automatically. User input systems 292 may include video game controllers, microphones, cameras, inertial measurement sensors, coupled devices, and other sensors for detecting user input.

Other control data 293 may also be provided to the system. Any of this data from auxiliary control system 285 may be used to adjust the focal distances for the one or more captured image elements. In one embodiment, in addition to auxiliary data system 285, the system may additionally accept manual adjustment 295.

In one embodiment, the image capture system 200 may capture multiple focal distances within a single image, utilizing the polarizer and a striped OPLE, as will be described below.

In one embodiment, the image capture system 200 may include a display system 299 to display the captured image. In one embodiment, the display system 299 may be a conventional display of a camera, showing what image is being captured. In one embodiment, the display system 299 may utilize a near-eye display system or other system which enables display of multiple image elements at multiple virtual distances.

Figure 3A:
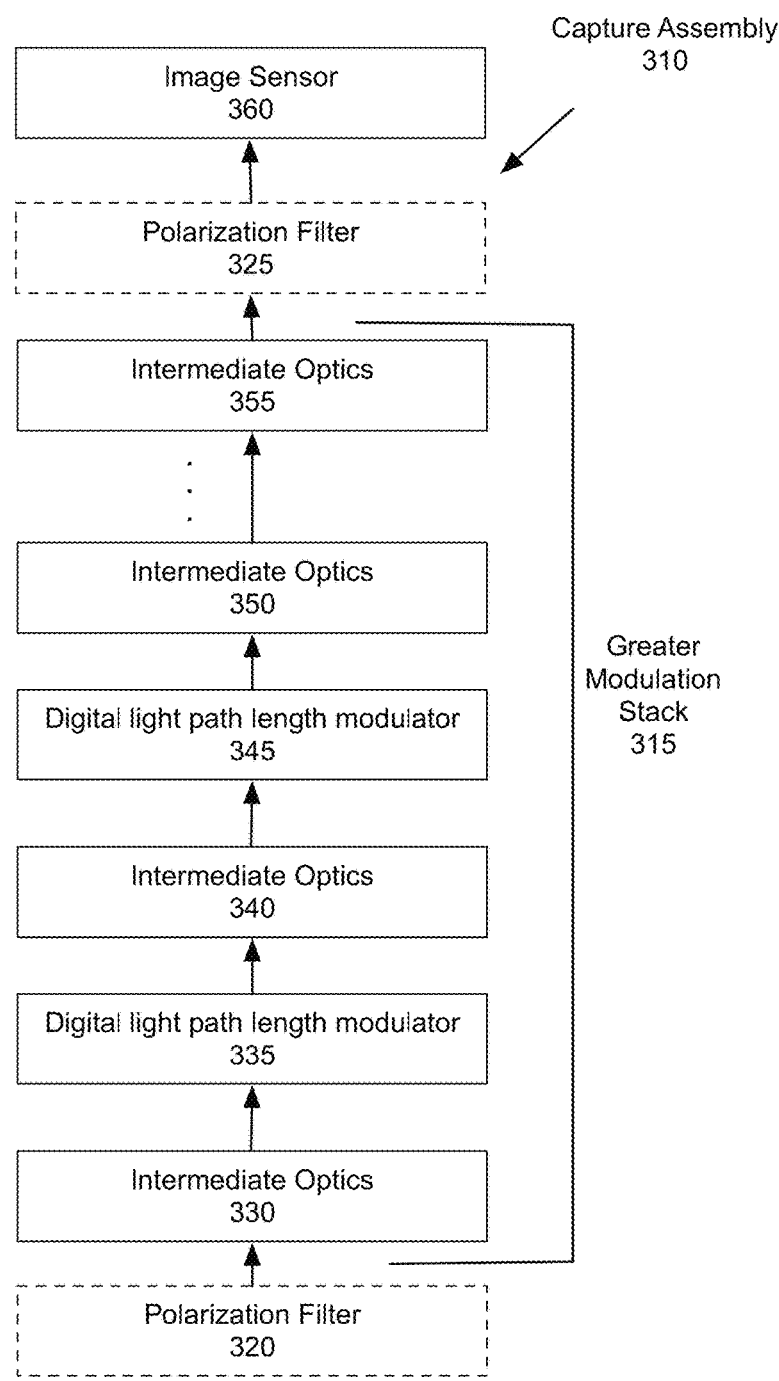
FIG. 3A is a block diagram of one embodiment of a capture assembly.

FIG. 3A is a block diagram of one embodiment of a capture assembly 310. The capture assembly 310, in one embodiment, includes a plurality of digital light path length modulators (335, 345) as well as a plurality of intermediate optics elements (330, 340, 350, 355) together forming a greater modulation stack 315. In one embodiment, the capture assembly 310 in a real system may include 6-30 elements which include lenses, mirrors, apertures, and the like, referred to as intermediate optics. In one embodiment, the intermediate optics may be interspersed with the digital light path length modulators. In one embodiment, they may be positioned before and/or after the set of digital light path length modulators. In one embodiment, polarization filter 320, 325 may be positioned before (320) or after (325) the greater modulation stack 315.

In one embodiment, the capture assembly 310 may correct for chromatic aberration and other irregularities of optical systems.

Figure 3B:
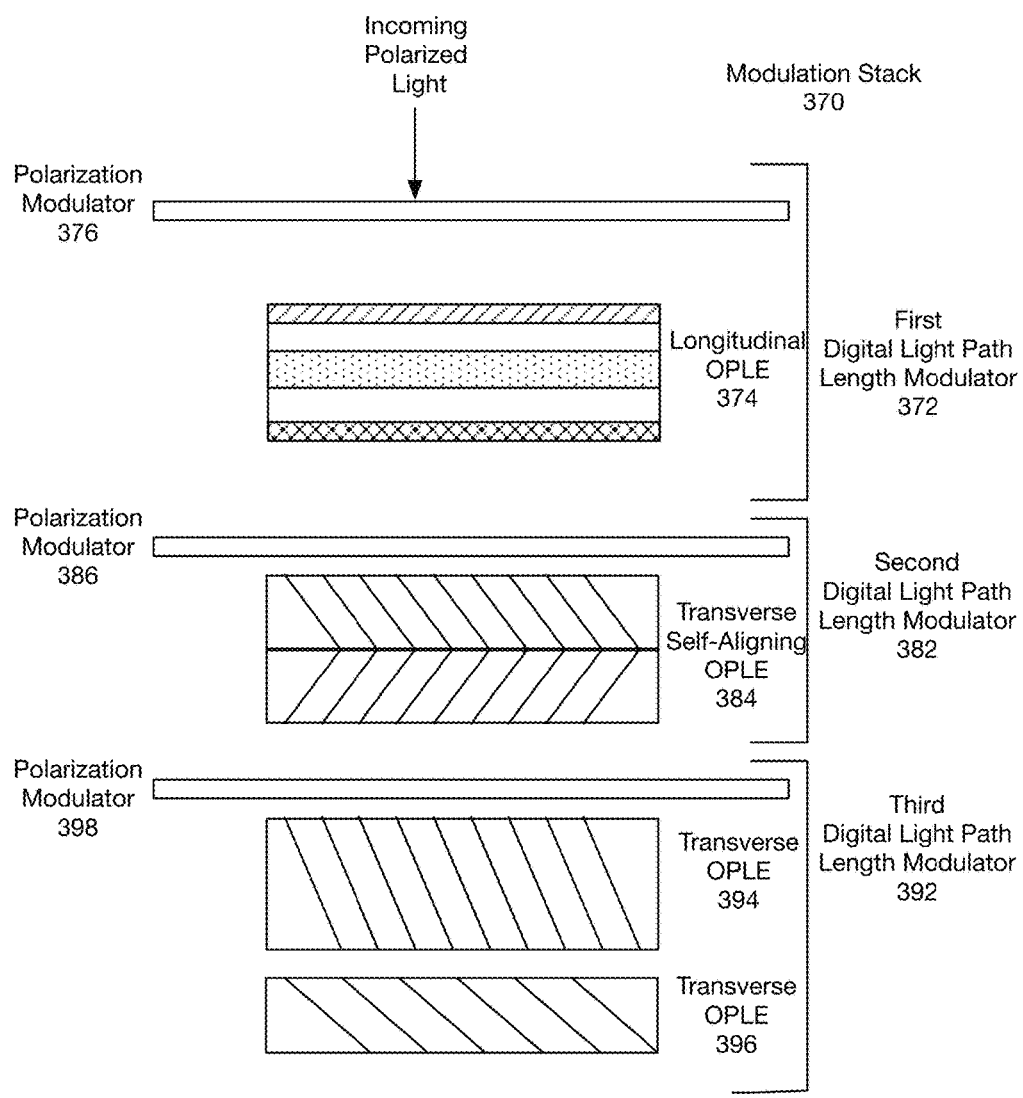
FIG. 3B is a diagram of one embodiment of an exemplary modulation stack including a plurality of digital light path length modulators.

FIG. 3B illustrates one embodiment of a modulation stack 370 including three digital light path length modulators. Each of the digital light path length modulators 372, 382, 392 includes a polarization modulator and an OPLE. In this example, one of the OPLEs 384 is a self-aligned OPLE. In this example, the first OPLE 374 is a longitudinal OPLE, while the other OPLEs are transverse OPLEs. One of the transverse OPLEs 384 is a self-aligning OPLE. These OPLEs are described in co-pending U.S. patent application Ser. No. 15/236,101, filed on Aug. 12, 2016 and U.S. patent application Ser. No. 15/358,040 filed on Nov. 21, 2016, incorporated herein by reference.

With the shown set of three different OPLEs, the system can create up to eight ($2^3$) virtual object distances by selectively modulating the polarization, as follows:

| OPLE 1 | OPLE 2 | OPLE 3 |
|--------|--------|--------|
| State 1 | State 1 | State 1 |
| State 1 | State 1 | State 2 |
| State 1 | State 2 | State 1 |
| State 1 | State 2 | State 2 |
| State 2 | State 1 | State 1 |
| State 2 | State 1 | State 2 |
| State 2 | State 2 | State 1 |
| State 2 | State 2 | State 2 |

In one embodiment, the configuration utilizes two OPLEs to be able to capture image elements at four focal distances.

Figure 4A:
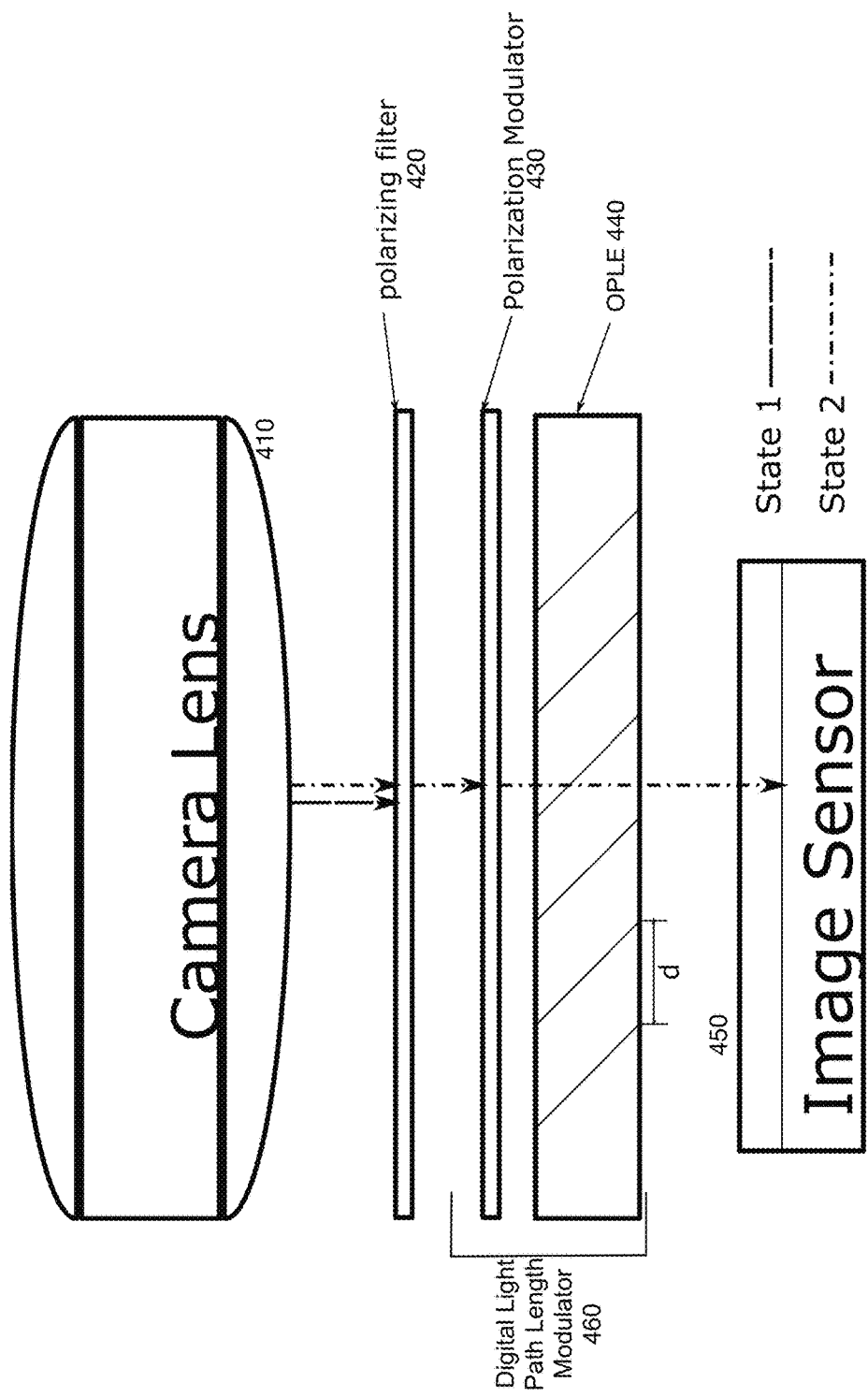
FIG. 4A is a diagram of one embodiment of using a camera system for capturing light with a first state, without reflection
Figure 4B:
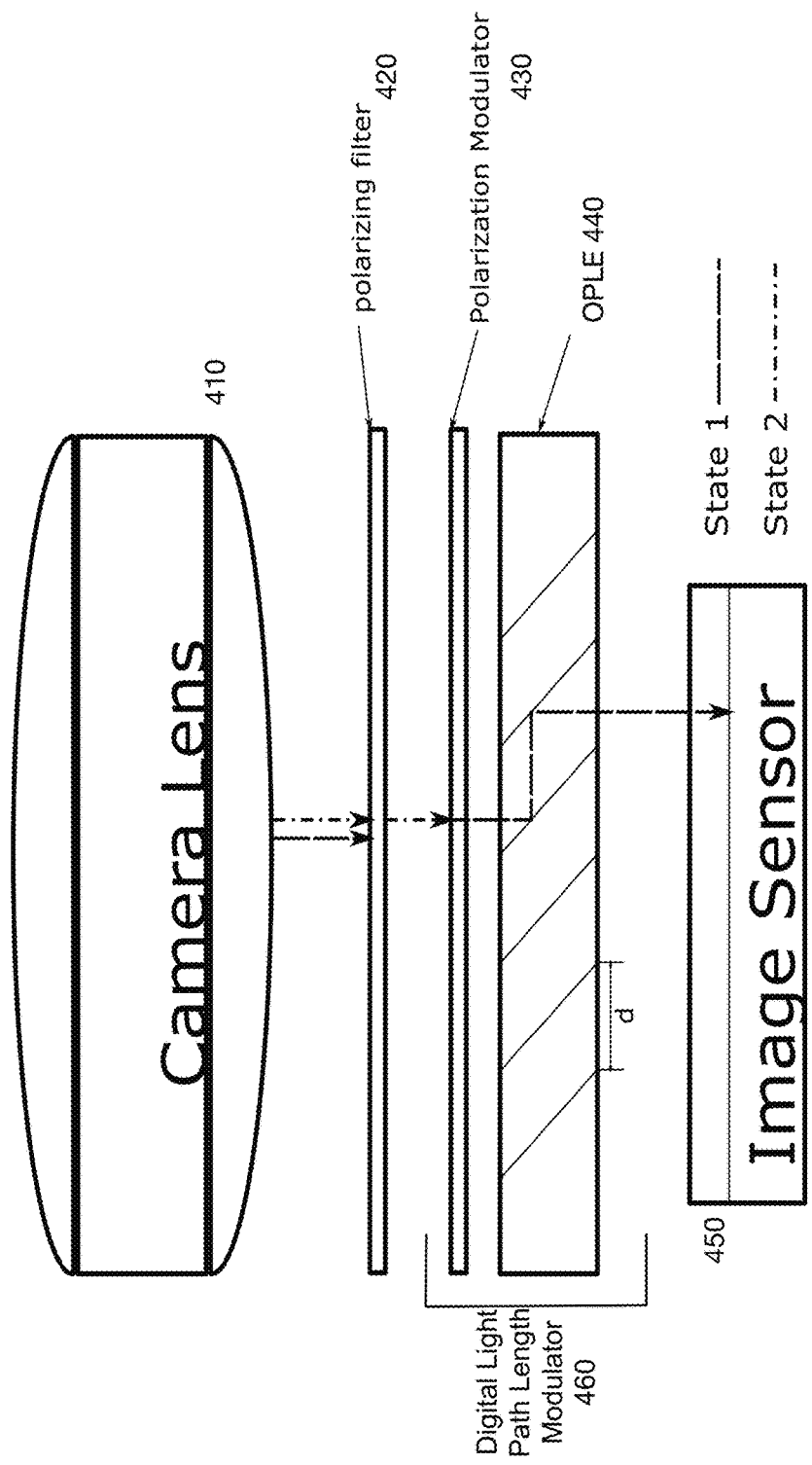
FIG. 4B is a diagram of one embodiment of using the camera system of FIG. 4A for light capturing light with a second state with reflection.

FIGS. 4A and 4B are diagrams of one embodiment of a digital light path length modulator in a camera system. The camera lens 410 captures the image data, and transmits it through the polarizing filter 420. The polarization modulator 430 selectively polarizes the light, and sends it through OPLE 440. The output from OPLE 440 goes to image sensor 450. The polarization modulator 430 is "off" in FIG. 4A, and the state 2 polarized light is not modulated. The OPLE 440 does not reflect state 2 polarized light, and thus the light passes straight through the digital light path length modulator 460. The light coming out digital light path length modulator 460 impacts the image sensor 450. Of course, though it is not shown, additional optical elements may be included in this system, including lenses, correction systems, etc.

FIG. 4B shows the same system when the polarization modulator 430 is on, and modulates the light to state 1 polarization. The state 1 polarized light goes through a longer light path, because it is reflected by the polarization sensitive reflective elements in the OPLE 440. This will cause objects at a nearer distance to come into focus without moving any elements of the imaging lens. Also, focus can be changed as fast as the polarization modulator can change states, which commonly can be under 50 milliseconds. The OPLE 440 and polarization modulator 430 form a digital light path length modulator 460. In one embodiment, the system may include a plurality of digital light path length modulators 460.

Figure 5A:
FIG. 5A and 5B are two embodiments of OPLEs which may be used in a digital light path length modulator.
Figure 5B:
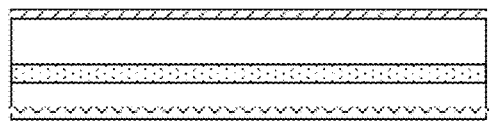

FIG. 5A and 5B are two embodiments of OPLEs which may be used in a digital light path length modulator. The two OPLEs are referred to as transverse OPLE (OPLE Type #1, FIG. 5A) and longitudinal OPLE (OPLE Type #2, FIG. 5B).

FIG. 5A is a diagram of one embodiment of a first type of OPLE, referred to as a transverse OPLE. The OPLE includes one or more plates, each plate having a plurality of polarization sensitive reflective elements, which reflect light having a first polarization, and pass through light with a second polarization. The reflected light bounces between the polarization sensitive reflective elements two or more times, before exiting the OPLE. This increases the path length of the light having the first polarization, compared to the light having the second polarization which passes directly through the transverse OPLE. Further details on the OPLE of FIG. 5A are discussed in co-pending U.S. patent application Ser. No. 15/236,101, filed on Aug. 12, 2016, which is incorporated herein in its entirety.

FIG. 5B is a diagram of one embodiment of a second type of OPLE, referred to as a longitudinal OPLE. The OPLE includes a reflective element on the bottom surface, which reflects light having a first polarization. The light in turn bounces back from the top of the OPLE, before exiting the OPLE through the bottom surface. This increases the path length of the light having the first polarization, compared to the light having the second polarization which passes directly through the longitudinal OPLE. Further details on the OPLE of FIG. 5B are discussed in co-pending U.S. patent application Ser. No. 15/358,040 filed on Nov. 21, 2016, which is incorporated herein in its entirety.

Figure 5C:
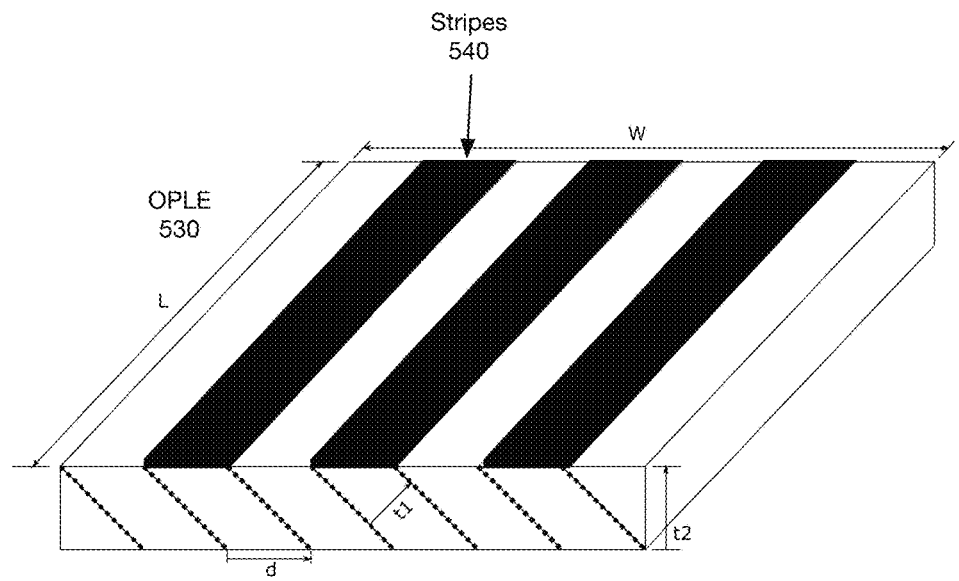
FIG. 5C is one embodiment of an OPLE striped for selective capture.

FIG. 5C is one embodiment of an OPLE striped for selective capture. The OPLE 530 has a plurality of stripes 540. In one embodiment, the stripes match the spacing between the reflective elements (d). In one embodiment, the stripes may extend slightly beyond the edge of the reflective element.

The stripes 540 provide a light blocking coating on the entry surface of the OPLE. In one embodiment, the light blocking coating is a metal. In one embodiment, the light blocking coating is aluminum. The polarization coating on the OPLE enables the striping of images at two focal distances onto a single image capture apparatus. The separate images can then be reconstructed in post-processing.

In one embodiment, the striped OPLE may assist in capturing multiple focal distances simultaneously. In one embodiment, additionally or alternatively, focal distances may be captured time sequentially, e.g. with different focal distances captured as the length of the image path is changed.

In one embodiment, for simultaneous capture of images, the reconstruction may utilize edge finding to identify the separation between the focal planes, which have a magnification difference.

Figure 5D:
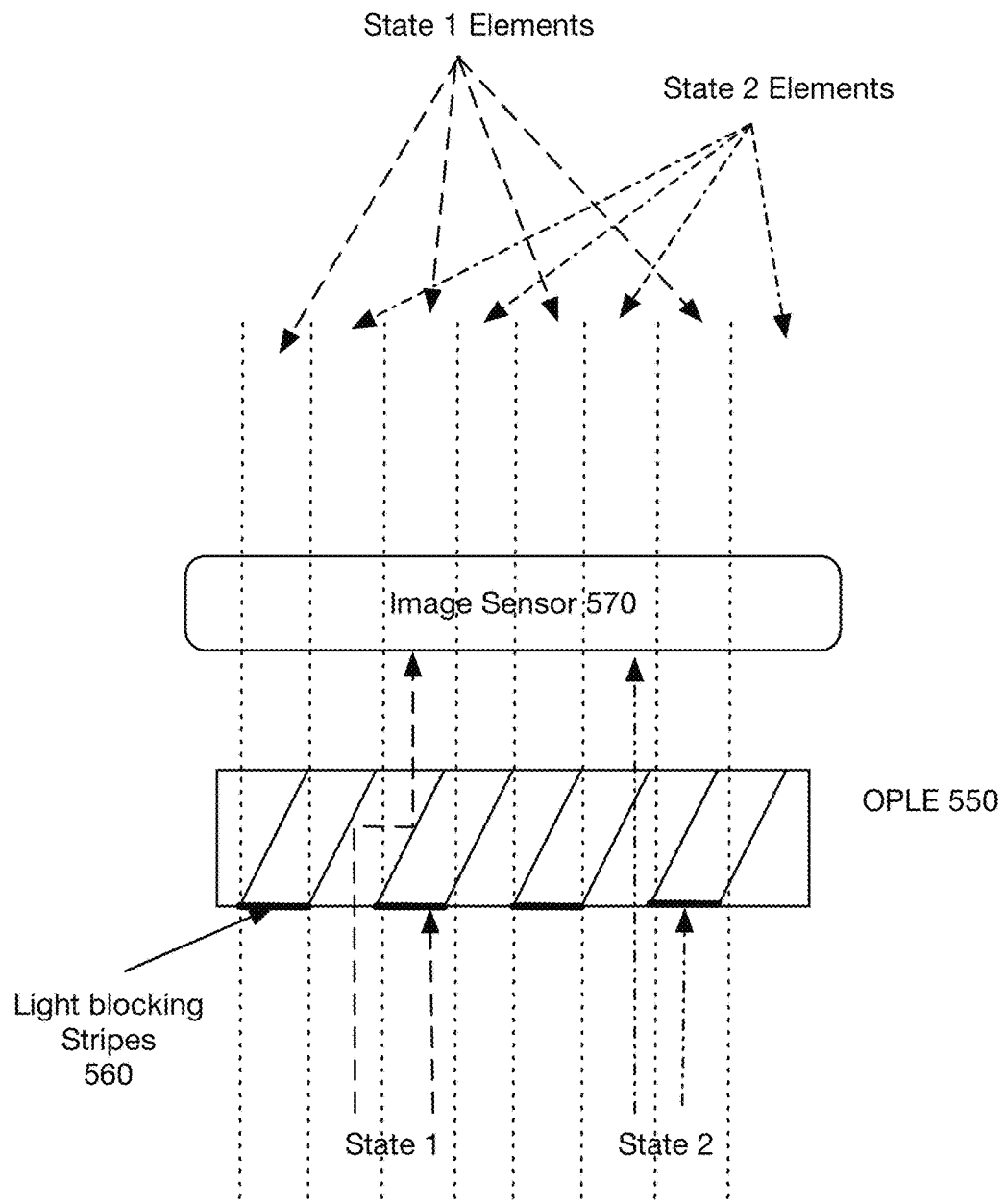
FIG. 5D illustrates one embodiment of the light paths in a striped OPLE.

FIG. 5D illustrates one embodiment of the light paths using a striped OPLE. As can be seen, the striped OPLE 550 receives both State 1 and State 2 incoming light. When the incoming light hits a portion of the OPLE 550 covered by a light blocking stripe 560, it does not pass through the OPLE 550. When the incoming light hits a portion of the OPLE 550 not covered with the light blocking stripe, it passes through the OPLE 550. As discussed above, state 1 light is reflected by the polarization sensitive reflective elements, while state 2 light passes through. Thus, state 1 light impacts the image sensor 570 in different locations than state 2 light, and the image captured by the image sensor 570 has separate stripes of image data, for state 1 and state 2 elements. These stripes may be separated to construct two images or a multifocal image.

Figure 5E:
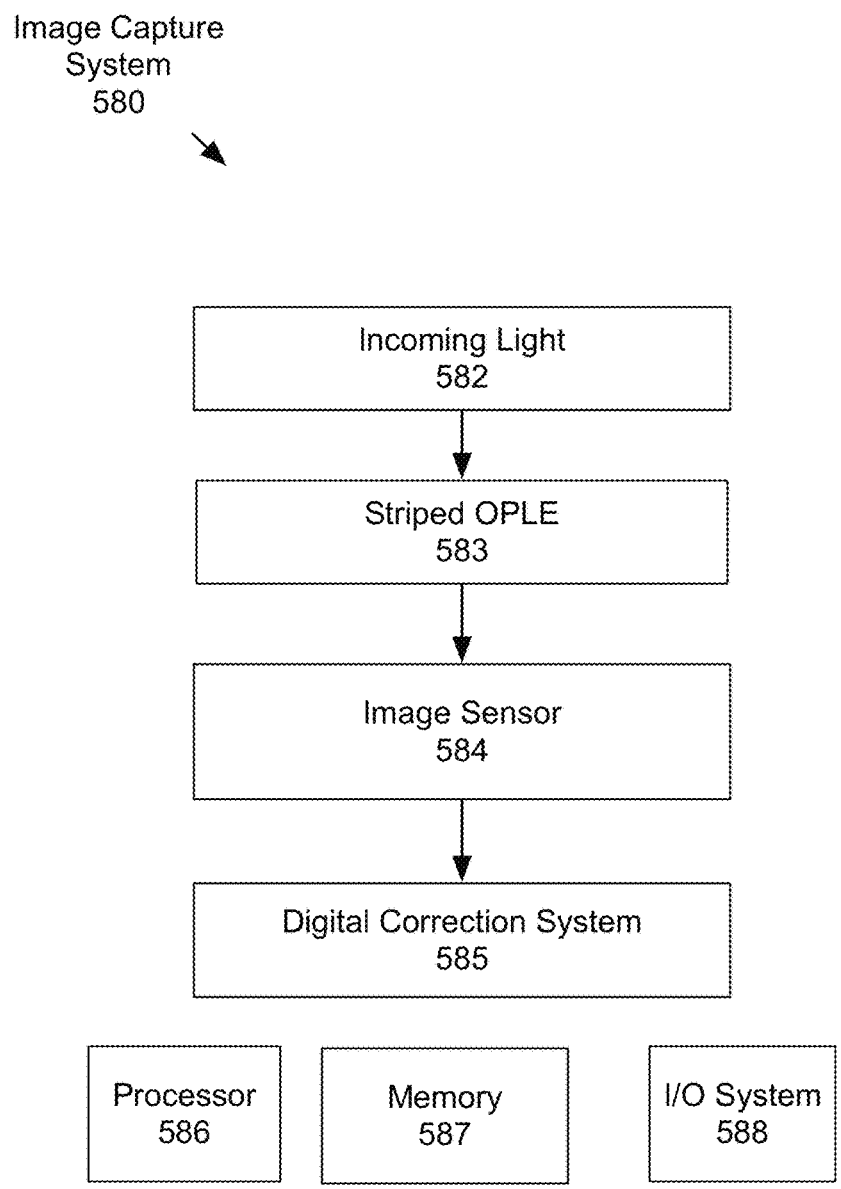
FIG. 5E is a diagram of one embodiment of an image capture system using a striped OPLE.

FIG. 5E is a diagram of one embodiment of an image capture system using a striped OPLE. The image capture system 580 receives incoming light 582, which is passed to a striped OPLE 583. The striped OPLE 583 stripes the image elements onto image sensor 584. In one embodiment, the OPLE 583 is positioned in close proximity to image sensor 584. In one embodiment, the distance between OPLE 583 and image sensor 584 is 0.1 mm. In one embodiment, the distance may range from 0 mm to 1 cm. In one embodiment, the striped OPLE may be coupled to, or integrated into, the image capture device.

As shown in FIG. 5D, the P-polarized image portions are separated from the S-polarized image portions. The image sensor 584 receives the image. Digital correction system 585 creates the image(s) from the received data. The image may be a multi-focal image, or two images at different focal distances. The different focal distances are controlled by the difference in light path lengths for the striped OPLE 583. In one embodiment, the image correction may be done using processor 586. In one embodiment, memory 587 may store the data, and I/O system 588 may communicate the data outside the image capture system 580. In one embodiment, additional optical elements, and optionally additional OPLEs or modulation stack elements may be incorporated into the system.

Figure 5F:
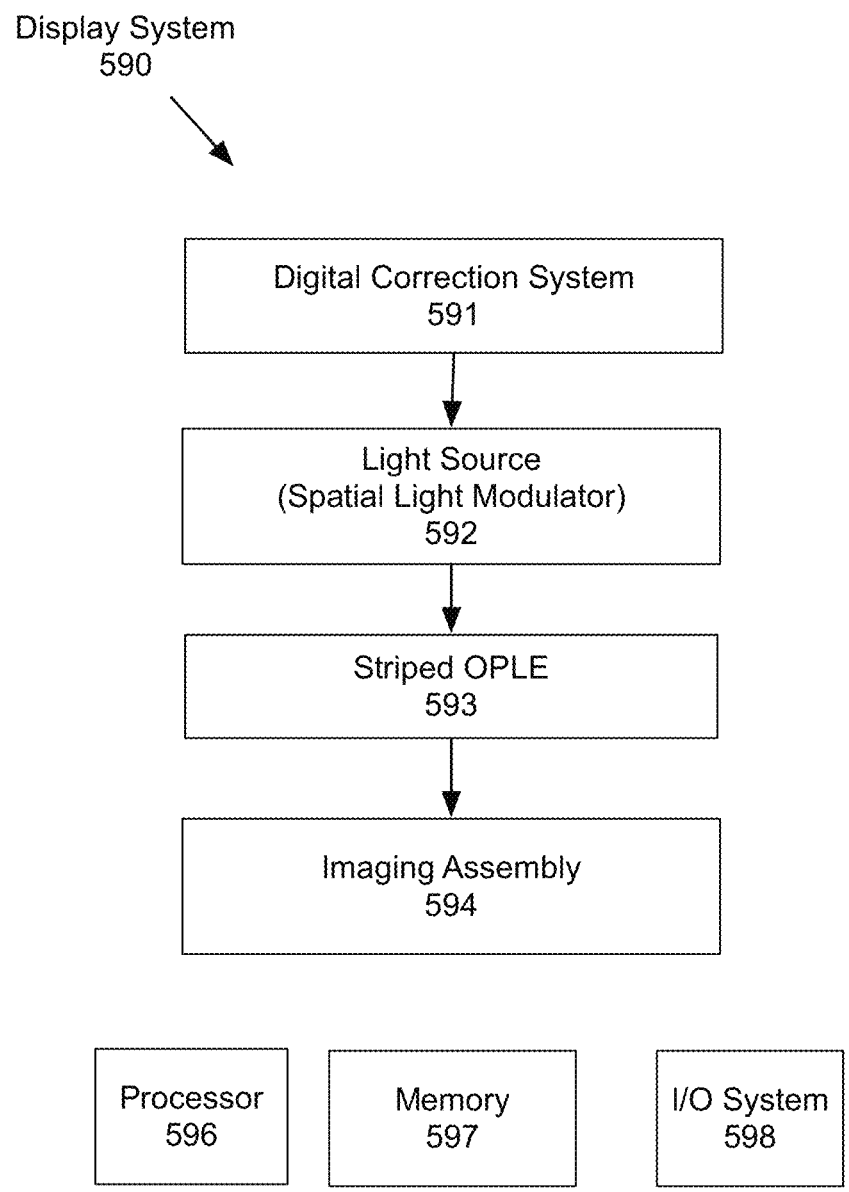
FIG. 5F is a diagram of one embodiment of an image display system using a striped OPLE.

FIG. 5F is a diagram of one embodiment of an image display system using a striped OPLE. The striped OPLE configuration may also be utilized in a display system. In a display system the light comes from light source 592. In one embodiment, the light source may be a spatial light modulator 592. In one embodiment, the light output by the light source 592 is controlled by digital correction system 591.

Striped OPLE 593 is positioned in proximity to the imaging assembly 594. The striped OPLE separates the portion of the light with S-polarization from the portion of the light with P-polarization, and has a longer light path for one of those polarizations. The imaging assembly 594 utilizes the image data to display image elements at two focal distances, corresponding to the two polarizations.

In one embodiment, the image correction and image assembly may be done using processor 596. In one embodiment, memory 597 may store the data, and I/O system 598 may obtain the data to be displayed from outside the display system 580. In one embodiment, additional optical elements, and optionally additional OPLEs or modulation stack elements may be incorporated into the system.

Figure 6:
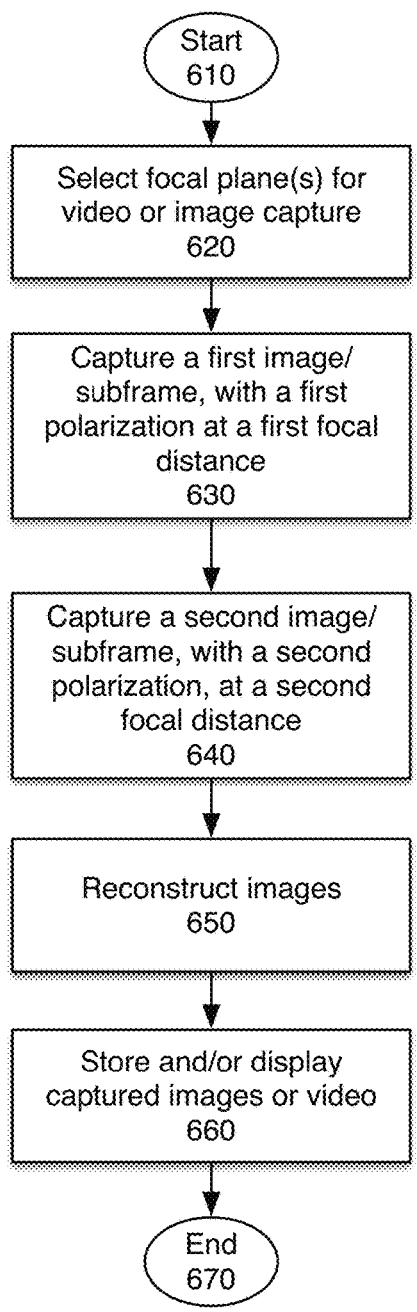
FIG. 6 is a flowchart of one embodiment of an overview of image capture using the modulation stack.

FIG. 6 is a flowchart of one embodiment of an overview of image capture using the modulation stack. The process starts at block 610. In one embodiment, the process starts when the system is turned on to capture images. In one embodiment, while the flowchart shows a single image captured at multiple focal distances, the system may be used to capture multiple images in a series, such as video capture. In one embodiment, the system can capture video images at multiple focal distances in one embodiment.

At block 620 the system selects one or more focal planes for capture. In one embodiment, the selection may be made manually by a user. In one embodiment, the selection may be made automatically by the system based on an evaluation of the image, as discussed above. In one embodiment, the focal planes may be a plurality of discrete focal steps, covering the real-world image being captured.

At block 630, the first image/subframe is captured with a first polarization, at first focal distance. At block 640, the second image/subframe is captured with a second polarization at a second focal distance. In one embodiment, the first and second images may be captured simultaneously. In another embodiment, the first and second images may be captured sequentially.

At block 650, the images are reconstructed. In one embodiment, a series of images captured at a plurality of focal lengths may be combined to create a single multi-dimensional image. In one embodiment, simultaneously captured images may be reconstructed by separating the image portions at the plurality of focal distances. In one embodiment, other adjustments may be made to the image, including color correction, optical correction, etc. This may be done by a processor on the image capture device, or on a separate computer system.

At block 660, the captured image data is stored and/or displayed. In one embodiment, the image data may be stored in memory. In one embodiment, interim image data may be stored in a cache memory, and the final image data may be stored in memory, which may be a flash memory, a hard drive, or other type of storage. In one embodiment, the displaying may be using a near-eye display system or other system capable of displaying multi-focal images. The process then ends at block 670. In one embodiment, if the system is capturing video or a stream of images, the system may automatically return to block 620, to select subsequent focal planes, and capture additional images, until it is turned off or otherwise terminated. Although this flowchart only shows two image/subframes being captured, it should be understood that any number of images/subframes may be captured, at different focal distances utilizing the described system and process.

Figure 7:
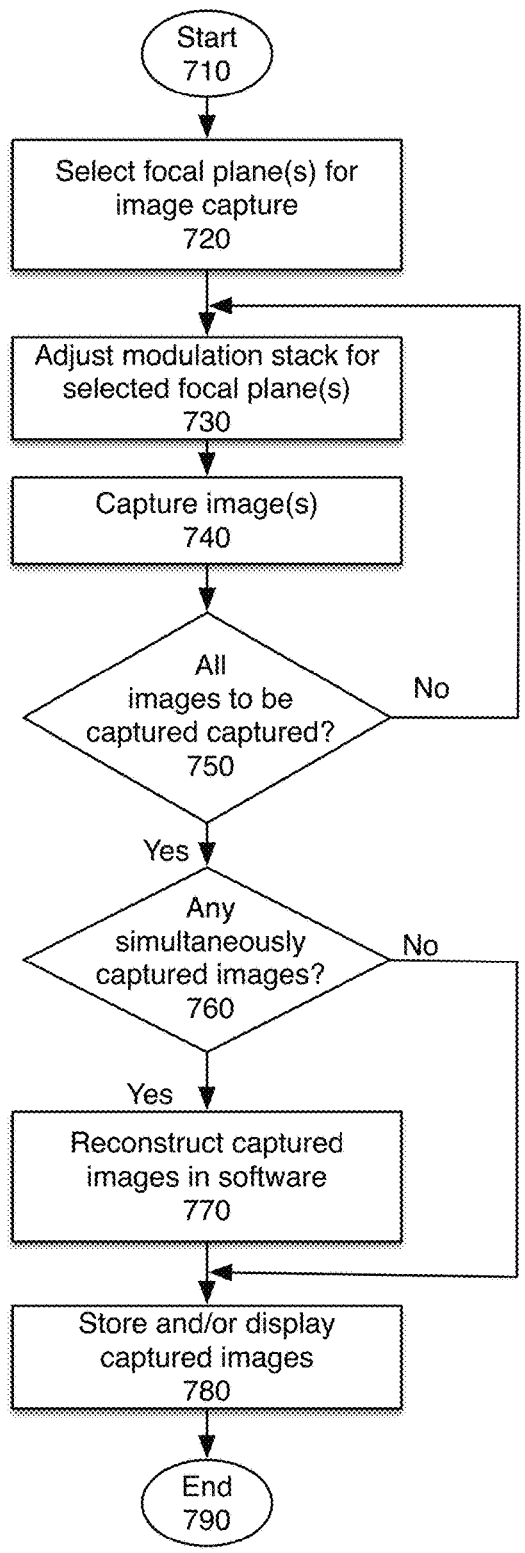
FIG. 7 is a more detailed flowchart of one embodiment of capturing an image using the system.

FIG. 7 is a more detailed flowchart of one embodiment of capturing an image using the system. The process starts at block 710.

At block 720, the system selects one or more focal planes for image capture. In one embodiment, for a system providing simultaneous capture, a plurality of simultaneously captured focal planes may be selected. In one embodiment, for a system providing sequential capture, the first focal plane for capture may be selected.

At block 730, the system adjusts the modulation stack for the selected focal planes. As discussed above, two potential focal planes may be selected for simultaneous capture, utilizing a striped OPLE, or utilizing a polarizer.

At block 740 the image(s) are captured.

At block 750, the process determines whether all of the images to be captured have been captured. If not, the process returns to block 730 to adjust the light path length through the modulation stack. As noted above this is done by altering the polarization of the light. If all images have been captured, the process continues to block 760.

At block 760, the process determines whether there are any simultaneously captured images. If not, at block 780, the captured image data is stored and/or displayed, and the process ends at block 790.

If there were simultaneously captured images, the process continues to block 770. The simultaneous images are captured on the same CCD/sensor, so the system, at block 770 reconstructs the individual images in software. In one embodiment, this may be done by identifying the edges of each captured image segment, separating the image segments by focal distance, and combining the image segments to generate an image. The process then continues to block 780.

Figure 8:
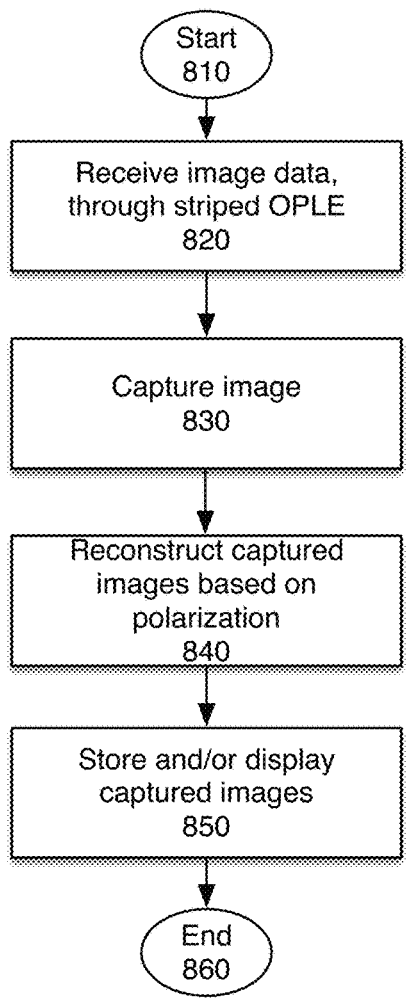
FIG. 8 is a flowchart of one embodiment of using a striped OPLE to capture images.

FIG. 8 is a flowchart of one embodiment of using a striped OPLE to capture images. The process starts at block 810.

At block 820, image data is received through a striped OPLE. In one embodiment, this configuration includes only a single OPLE, which is striped. In one embodiment, the striping is as shown in FIG. 5C. In another embodiment, this configuration may include a plurality of OPLEs. In one embodiment, only one of the plurality of OPLEs is striped. In one embodiment, the final OPLE is striped.

At block 830, the image is captured. As noted above, the image captures two focal distances in a single image, separated by polarization, based on the striping.

At block 840, the captured images are reconstructed. The reconstruction of the images in one embodiment creates two separate complete images, having different focal distances.

At block 850, the captured images are stored and/or displayed. The process then ends at block 860.

Figure 9:
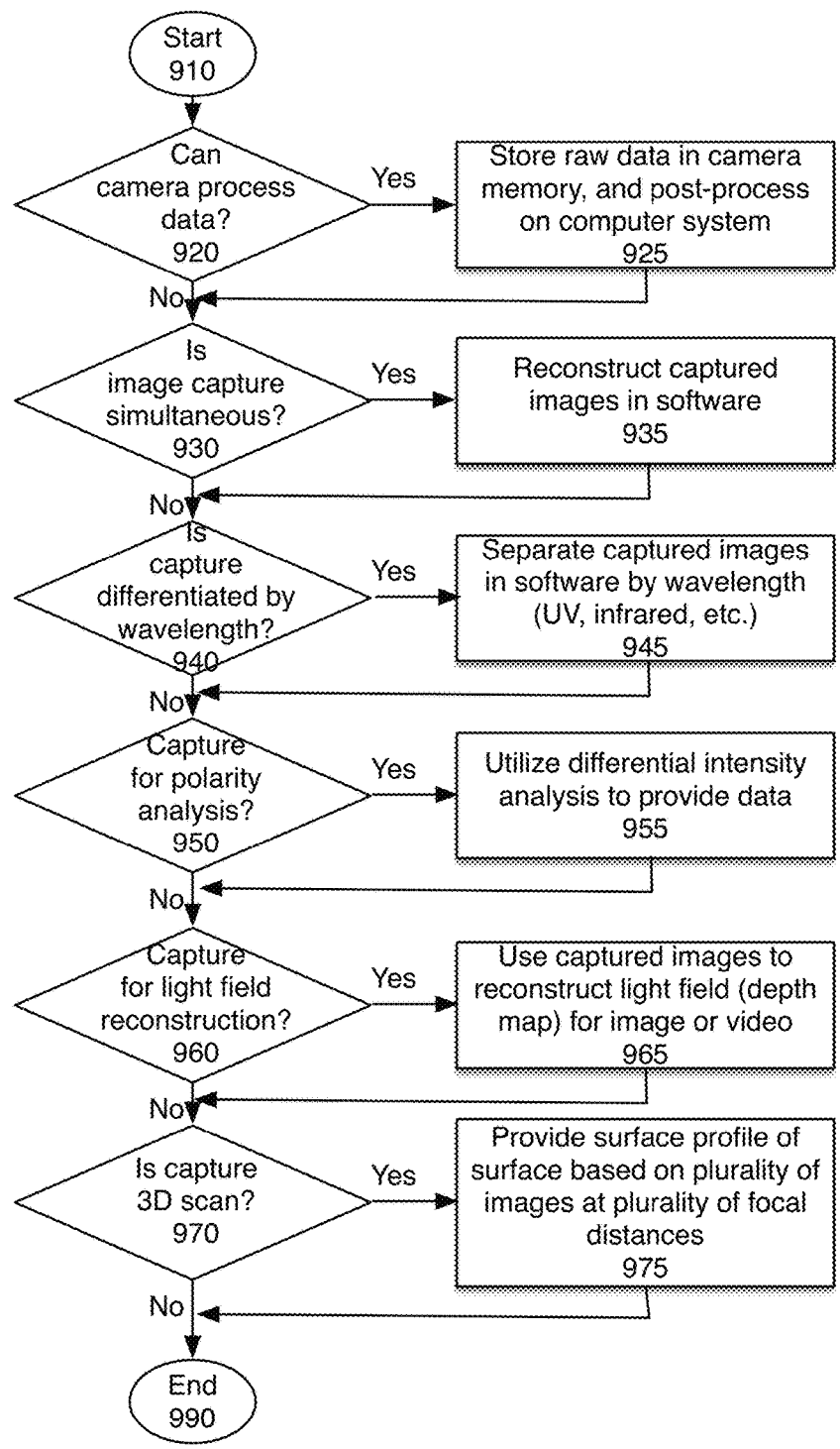
FIG. 9 is a flowchart of one embodiment of applications of the image capture system disclosed.

FIG. 9 is a flowchart of one embodiment of applications of the image capture system disclosed. The image capture system described can capture various types of images, which may be used for the creation of additional data about the scene which is captured. As noted above, the image being captured can range from a nature scene, to a medical images (for example, capturing a surgical site at multiple distances), microscopy, biometric images (for example capturing a fingerprint image and an image of the blood flow underneath the fingerprint), to a plurality of individuals standing at different distances, etc.

At block 920, the process determines whether the image capture system is capable of processing the data locally. There may be image capture systems that have integrated processors capable of processing the data locally. However, some systems cannot do so. For example, the system may be implemented as a retrofit lens for a camera. In such an embodiment, the modulation stack may be built into a camera lens assembly, enabling retrofitting of existing camera bodies for multi-focal capture. Such systems cannot perform post-processing. There are other embodiments in which the camera cannot perform processing, or can only do some of the potential processing needed to generate the final images.

If the camera can process locally, in one embodiment, it does so, and the process continues directly to block 930. If the image capture device cannot complete processing locally, at block 925, the post-processing, such as image separation, and building of multi-dimensional images, is implemented in a separate system. In one embodiment, the processing may be split between the computer and the image capture device, with the image capture device doing pre-processing.

In one embodiment, the separate system may be a client computer. In one embodiment, the separate system may be a server computer. If a server computer is used, in one embodiment, the user (or user's computer or other device) may upload the image data to a server, and receive the processed image data from the server. The process then continues to block 930.

At block 930, the process determines whether image capture was simultaneous. When image capture is simultaneous a single sensor captures interleaved slices of images at more than one focal distance. In such an instance the images are separated in post-processing, at block 935. The process then continues to block 940.

At block 940, the process determines whether the capture is differentiated by wavelength. In one embodiment, the images may be separated by wavelength, rather than focal length, or in addition to focal length. If so, at block 945, the captured images are separated by wavelength. This enables capturing data such as blood flow, and other image data not in the visible spectrum. The process then continues to block 950.

At block 950, the process determines whether the data is designed for polarity analysis. If so, at block 955, differential intensity analysis is used to generate this data, at block 955. This may be used to discern polarity of things, based on the energy distribution from a light source. The differential intensity of two polarities may be used to determine the elliptical polarities. The process then continues to block 960.

At block 960, the process determines whether the data is designed for light field reconstruction. Light field reconstruction captures all the rays of light, so that each pixel captures not only the total light level, but the directionality of the light. By capturing a plurality of images, at different focal distances, the directionality of each light ray may be used to reconstruct the light field, at block 965. By capturing the light field, the system can later adjust the focus area(s). The process then continues to block 970.

At block 970, the process determines whether the data is for a 3D scan. A 3D scan reconstructs a three-dimensional image. By capturing a plurality of images at a plurality of focal distances, the system may be used to construct a 3D image. This is done at block 975.

In one embodiment, the system may also be used for 360 degree spherical cameras. By capturing a sequence of images with different orientations, with uniform focal changes at the plurality of orientations, the system can capture data at a plurality of discrete focal steps, that can be calibrated for. This may enable easier stitching of images to create the 360 degree image. Of course, this technique, like the others described, may be applied to video or image sequences as well as still images.

The process then ends at block 990.

Figure 10:
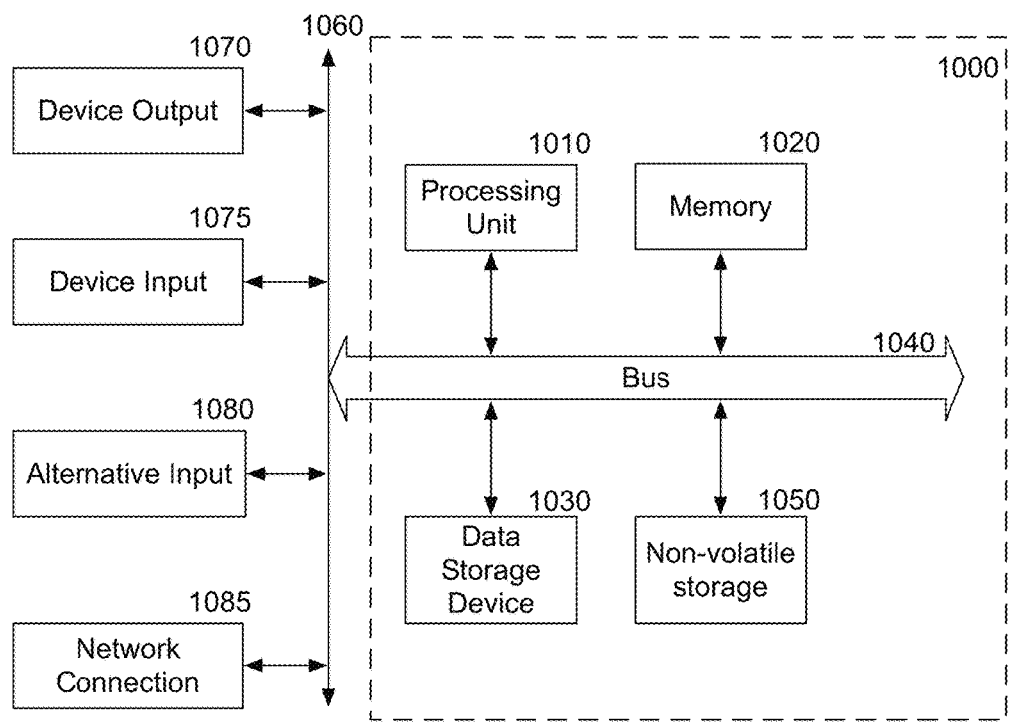
FIG. 10 is a block diagram of one embodiment of a computer system that may include a memory and processor to enable post-processing.

FIG. 10 is a block diagram of one embodiment of a computer system that may be used with the present invention. The computer system may be utilized in setting the focal distances for image capture, for reconstruction of the image based on the captured image data, and for post-processing the data to enable some or all of the features discussed above. In one embodiment, the reconstructed image data may be then displayed, using the computer system. The display may be a near-eye display or another type of display.

The data processing system illustrated in FIG. 10 includes a bus or other internal communication means 1040 for communicating information, and a processing unit 1010 coupled to the bus 1040 for processing information. The processing unit 1010 may be a central processing unit (CPU), a digital signal processor (DSP), or another type of processing unit 1010.

The system further includes, in one embodiment, a random access memory (RAM) or other volatile storage device 1020 (referred to as memory), coupled to bus 1040 for storing information and instructions to be executed by processor 1010. Main memory 1020 may also be used for storing temporary variables or other intermediate information during execution of instructions by processing unit 1010.

The system also comprises in one embodiment a read only memory (ROM) 1050 and/or static storage device 1050 coupled to bus 1040 for storing static information and instructions for processor 1010. In one embodiment, the system also includes a data storage device 1030 such as a magnetic disk or optical disk and its corresponding disk drive, or Flash memory or other storage which is capable of storing data when no power is supplied to the system. Data storage device 1030 in one embodiment is coupled to bus 1040 for storing information and instructions.

The system may further be coupled to an output device 1070, such as a cathode ray tube (CRT) or a liquid crystal display (LCD) coupled to bus 1040 through bus 1060 for outputting information. The output device 1070 may be a visual output device, an audio output device, and/or tactile output device (e.g. vibrations, etc.).

An input device 1075 may be coupled to the bus 1060. The input device 1075 may be an alphanumeric input device, such as a keyboard including alphanumeric and other keys, for enabling a user to communicate information and command selections to processing unit 1010. An additional user input device 1080 may further be included. One such user input device 1080 is a cursor control device, such as a mouse, a trackball, stylus, cursor direction keys, or touch screen, may be coupled to bus 1040 through bus 1060 for communicating direction information and command selections to processing unit 1010, and for controlling movement on display device 1070.

Another device, which may optionally be coupled to computer system 1000, is a network device 1085 for accessing other nodes of a distributed system via a network. The communication device 1085 may include any of a number of commercially available networking peripheral devices such as those used for coupling to an Ethernet, token ring, Internet, or wide area network, personal area network, wireless network or other method of accessing other devices. The communication device 1085 may further be a null-modem connection, or any other mechanism that provides connectivity between the computer system 1000 and the outside world.

Note that any or all of the components of this system illustrated in FIG. 10 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1020, mass storage device 1030, or other storage medium locally or remotely accessible to processor 1010.

It will be apparent to those of ordinary skill in the art that the system, method, and process described herein can be implemented as software stored in main memory 1020 or read only memory 1050 and executed by processor 1010. This control logic or software may also be resident on an article of manufacture comprising a computer readable medium having computer readable program code embodied therein and being readable by the mass storage device 1030 and for causing the processor 1010 to operate in accordance with the methods and teachings herein.

The present invention may also be embodied in a handheld or portable device containing a subset of the computer hardware components described above. For example, the handheld device may be configured to contain only the bus 1040, the processor 1010, and memory 1050 and/or 1020.

The handheld device may be configured to include a set of buttons or input signaling components with which a user may select from a set of available options. These could be considered input device #1 1075 or input device #2 1080. The handheld device may also be configured to include an output device 1070 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1010, a data storage device 1030, a bus 1040, and memory 1020, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1085.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1010. A machine-readable medium includes any mechanism for storing information in a form readable by a machine (e.g. a computer). For example, a machine readable medium includes read-only memory (ROM); random access memory (RAM); magnetic disk storage media; optical storage media; flash memory devices; or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. An image capture system comprising:
   a lens directed at a scene to be captured;
   a modulation stack comprising one or more digital light path length modulators, a digital light path length modulator comprising:
   a polarization modulator to receive light and to selectively modulate a polarization of the light; and
   an optical path length extender (OPLE) to direct the light having a first polarization through a first light path through the OPLE, and to direct the light having a second polarization through a second light path through the OPLE, the first and second light paths having different light path lengths;
   wherein the modulation stack adjusts the path length of the light by altering the polarization of the light between the one or more digital light path length modulators to create a plurality of light path lengths; and
   an image sensor to capture a plurality of image portions at a plurality of focal distances, from the data captured by the modulation stack, wherein a number of focal distances depends on the number of the one or more digital light path length modulators.

2. The image capture system of claim 1, wherein a farthest virtual object distance is infinity, and the focal distances move in discrete steps.

3. The image capture system of claim 1, further comprising:
   a digital correction system to separate simultaneously captured image portions with different focal distances.

4. The image capture system of claim 1, wherein the polarization modulator alters the path length on a time sequential basis, enabling the image sensor to capture a time sequential series of images at a plurality of focal distances.

5. The image capture system of claim 1, further comprising:
   an auxiliary control system to enable selection of the plurality of focal distances for the image capture.

6. The image capture system of claim 1, further comprising:
   a display system to display the plurality of image portions at the plurality of focal distances.

7. The image capture system of claim 1, further comprising:

a last OPLE in the modulation stack, the last OPLE including a plurality of stripes, to enable simultaneous capture of image elements at two focal distances with the image capture device.

8. The image capture system of claim 1, further comprising:
a camera body including the image sensor and a lens; and
the modulation stack implemented in a camera lens assembly, enabling retrofitting of an existing camera for multi-focal image capture.

9. The image capture system of claim 1, further comprising:
a processor to process captured data from the image sensor, the processor to enable one or more of: reconstructing the captured data based on one of polarization or wavelength, perform wavelength-based analysis, reconstructing a light field based on two or more images at different focal distances, generating a 3D scan based on a plurality of images at a plurality of focal distances, and creating a multi-focal 360 degree photo.

10. The image capture system of claim 1, wherein the image captured is video, and the system continuously captures video frames at a plurality of focal distances.

11. The image capture system of claim 10, wherein the plurality of focal distances are adjustable during the image capture.

12. An image capture system comprising:
a modulation stack comprising one or more digital light path length modulators, a digital light path length modulator comprising:
a polarization modulator to receive light and to selectively modulate a polarization of the light, wherein the polarization modulator alters the path length on a time sequential basis, enabling the image capture device to capture a time sequential series of images at a plurality of focal distances; and
an optical path length extender (OPLE) to direct the light having a first polarization through a first light path through the OPLE, and to direct the light having a second polarization through a second light path through the OPLE, the first and second light paths having different light path lengths; and
an image capture device to capture a plurality of image portions at a plurality of focal distances.

13. The image capture system of claim 12, further comprising:
an auxiliary control system to enable selection of a focal distance for the image capture.

14. The image capture system of claim 13, wherein the auxiliary control system includes content-based focal distance selection to automatically identify one or more focal distances for capture.

15. The image capture system of claim 12, comprising:
a last OPLE in the modulation stack, the last OPLE including a plurality of stripes, to enable simultaneous capture of image elements at two focal distances with the image capture device.

16. The image capture system of claim 12, wherein the modulation stack is implemented in a camera lens assembly, enabling retrofitting of an existing camera for multi-focal image capture.

17. An image capture system comprising:
an image capture sub-system including:
a lens directed at a scene to be captured;
a modulation stack comprising one or more digital light path length modulators, a digital light path length modulator comprising:
a polarization modulator to receive light and to selectively modulate a polarization of the light; and
an optical path length extender (OPLE) to direct the light having a first polarization through a first light path through the OPLE, and to direct the light having a second polarization through a second light path through the OPLE, the first and second light paths having different light path lengths; and
an image sensor to capture a plurality of image portions at a plurality of focal distances, from the data captured by the modulation stack, wherein a number of focal distances depends on the number of the one or more digital light path length modulators;
an auxiliary control system to select the plurality of focal distances;
a processor to process the captured data, to generate one or more of: a plurality of images at a plurality of focal distances, or a multi-focal image;
a camera including the image capture subassembly; and
a computer system including the processor, wherein the camera and the computer system are coupled using an I/O system.

18. An optical path length extender (OPLE) comprising:
a plurality of polarization sensitive reflective elements parallel to each other and at an angle of between 20 degrees and 70 degrees to a path of light entering the OPLE, to direct the light having a first polarization through a first light path through the OPLE, and to direct the light having a second polarization through a second light path through the OPLE, the first and second light paths having different light path lengths;
a plurality of light blocking stripes on an entry surface of the OPLE, to block light;
wherein an output of the OPLE comprises alternating stripes of image data, at a first and a second focal distance;
an image capture apparatus to capture image data at two focal distances; and
an image display apparatus to display data at two focal distances.

19. An image capture system comprising:
a lens directed at a scene to be captured;
an optical path length extender (OPLE) to direct the light having a first polarization through a first light path through the OPLE, and to direct the light having a second polarization through a second light path through the OPLE, the first and second light paths having different light path lengths;
a polarizer;
a digital light path length modulator comprising:
a polarization modulator to receive light and to selectively modulate a polarization of the light; and
the optical path length extender (OPLE) to receive the light from the polarization modulator; and an image sensor to capture a plurality of image portions at a plurality of focal distances, from the data captured by the modulation stack.

20. The image capture system of claim 19, wherein the OPLE further comprises:
a plurality of polarization sensitive reflective elements parallel to each other and at an angle of between 20 degrees and 70 degrees to a path of light entering the OPLE;

a plurality of light blocking stripes on an entry surface of the OPLE, to block light;
wherein an output of the OPLE comprising alternating stripes of image data, at a first and a second focal distance.

* * * * *